W. H. LANDIS.
DIRIGIBLE HEADLIGHT.
APPLICATION FILED JULY 8, 1918.
1,294,344.
Patented Feb. 11, 1919.
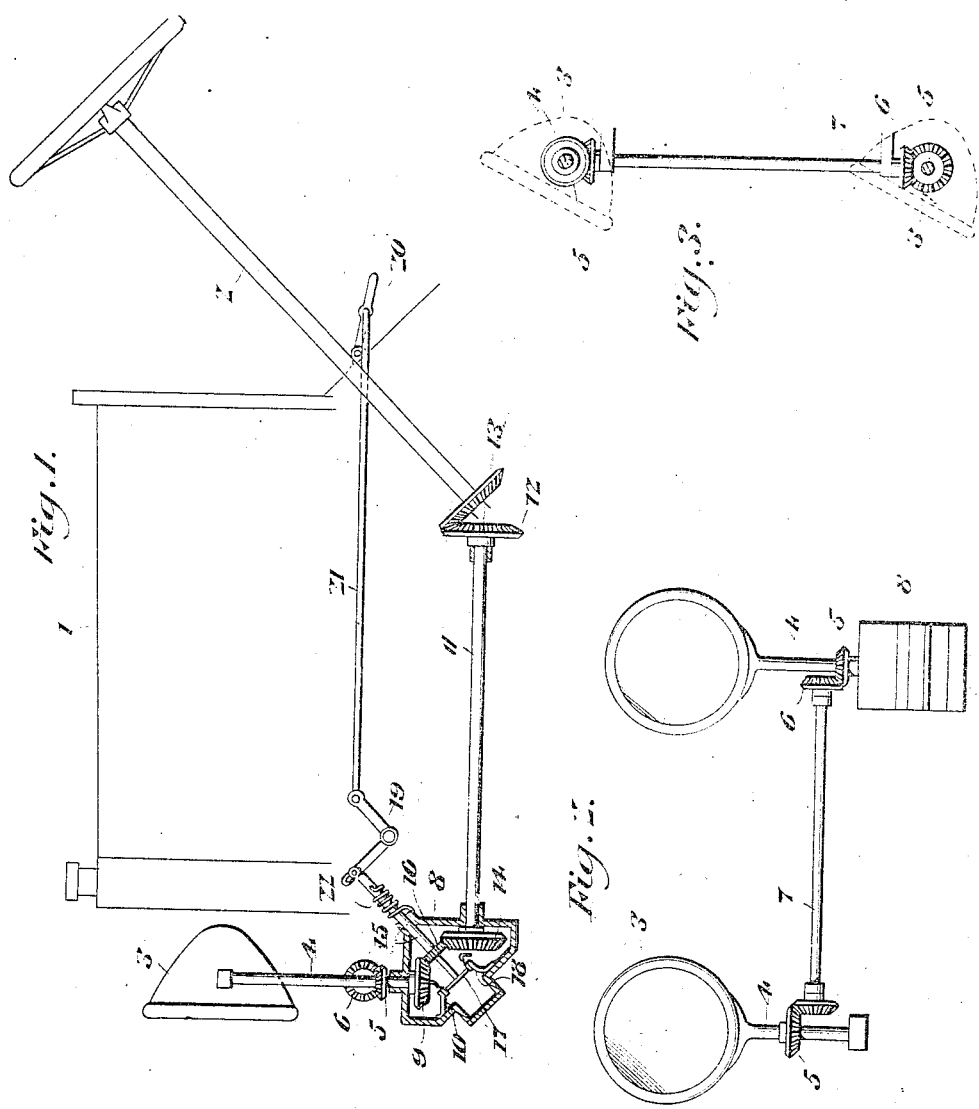
Witnesses:
Inventor
W. H. Landis
By Victor J. Evans
Attorney

UNITED STATES PATENT OFFICE.

WILLIAM HENRY LANDIS, OF MOUNT SIDNEY, VIRGINIA.

DIRIGIBLE HEADLIGHT.

1,294,344. Specification of Letters Patent. Patented Feb. 11, 1919.

Application filed July 8, 1918. Serial No. 243,824.

*To all whom it may concern:*

Be it known that I, WILLIAM H. LANDIS, a citizen of the United States, residing at Mount Sidney, in the county of Augusta and State of Virginia, have invented new and useful Improvements in Dirigible Headlights, of which the following is a specification.

This invention relates to new and useful improvements in dirigible headlights for automobiles and the principal object of the invention is to provide means for causing the headlights to turn with the steering mechanism of the car to cause the rays of light to illuminate the road on curves as well as the straight portions.

Another object of the invention is to provide means for connecting the lamps with the electric circuit and at the same time connecting the turning means for the lamp with the steering means.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic view of the invention applied to an automobile.

Fig. 2 is a front view.

Fig. 3 is a plan view.

In these views 1 indicates the automobile and 2 the steering post thereof. 3 indicates the lamps which are carried by the uprights 4. These uprights are provided with the beveled gears 5. As will be seen these gears are oppositely arranged and are engaged by gears 6 on a cross shaft 7 so that the rotation of this shaft 7 will cause the lamps to be moved in unison.

The lower ends of the shafts 4 are suitably journaled in a part of the automobile. A casing 8 is located below the journal of one of the shafts 4 and said shaft is extended within said casing. The extended end of said shaft receives a beveled gear 9. An electric wire passes through the post 4 to the lamp and at the lower end of the post 4 said wire is secured to a contact 10 located within the casing.

11 is a horizontal shaft having one end journaled in the casing 8 and its other end suitably journaled in the frame of the automobile adjacent the lower end of the steering post 2. This shaft is provided with a gear 12 which meshes with a gear 13 on said steering post and its other end is provided with a beveled gear 14.

A longitudinally movable shaft 15 is suitably carried by the casing with one end projecting therefrom. Within the casing said shaft is provided with a small gear 16 and a switch 17. 18 represents a contact within the casing to which one of the wires of the electric circuit is connected.

It will be seen that the contacts 10 and 18 are so located that the space between them will be bridged by the switch 17 when the shaft 15 is moved longitudinally to bring the gear 16 in mesh with the gears 9 and 14. This will connect the lamps with the electric circuit and at the same time connect the posts of the lamps with the steering post so that when said steering post is rotated to steer the automobile the lamps will be turned so that the rays of light will follow the road.

The means for moving the shaft 15 comprises a bell crank lever 19 having one end connected with said shaft and its other end connected with an operating lever 20 by means of the connection 21.

The operating lever 20 may be located adjacent the base of the steering post where the same passes through the floor of the automobile so that said lever may be operated by the foot. 22 indicates a spring for moving the shaft 15 upwardly to throw the gear and switch to operative position.

It is thought from the foregoing description that the advantages and novel features of my invention will be readily apparent.

I desire it to be understood that I may make such changes in the construction and in the combination and arrangement of the several parts, provided that such changes fall within the scope of the appended claims.

What I claim is:—

1. A device of the class described comprising a pair of posts, lamps carried thereby, gearing for connecting said posts with the steering post, a longitudinally movable shaft carrying one of said gears, means for moving said shaft, and means for controlling the lighting and extinguishing of the lamps by the movement of said shaft.

2. A device of the class described comprising a pair of posts, lamps carried thereby, a casing below said posts, a gear on one post located within the casing, a horizontal shaft having one end extending within said casing, a gear on said end, gearing connecting said horizontal shaft with the steering post, a longitudinally movable shaft in the casing having one end projecting therefrom, a gear secured to said shaft and in one position of said shaft meshing with the gears on the post and horizontal shaft, means on said longitudinally movable shaft for controlling the lighting and extinguishing of the lamps, an operating lever and means for connecting said lever with the longitudinally movable shaft.

In testimony whereof I affix my signature.

WILLIAM HENRY LANDIS,
(*Usually written W. H. Landis.*)